United States Patent
Bertze et al.

(10) Patent No.: US 8,804,492 B2
(45) Date of Patent: Aug. 12, 2014

(54) HANDLING ALARMS BASED ON USER SESSION RECORDS

(75) Inventors: Åsa Bertze, Spanga (SE); Andras Valkó, Hässelby (SE); András Veres, Budapest (HU)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 108 days.

(21) Appl. No.: 13/392,936

(22) PCT Filed: Aug. 28, 2009

(86) PCT No.: PCT/SE2009/050973
§ 371 (c)(1),
(2), (4) Date: Feb. 28, 2012

(87) PCT Pub. No.: WO2011/025424
PCT Pub. Date: Mar. 3, 2011

(65) Prior Publication Data
US 2012/0163194 A1    Jun. 28, 2012

(51) Int. Cl.
*H04L 12/26* (2006.01)
*H04L 12/24* (2006.01)
*H04L 12/56* (2006.01)

(52) U.S. Cl.
CPC ............ *H04L 41/0654* (2013.01); *H04L 45/28* (2013.01); *H04L 41/0893* (2013.01)
USPC .......................... 370/218; 370/241.1; 370/242

(58) Field of Classification Search
None
See application file for complete search history.

(56) References Cited

U.S. PATENT DOCUMENTS

| 6,173,324 | B1 * | 1/2001 | D'Souza ...................... 709/224 |
| 6,393,386 | B1 * | 5/2002 | Zager et al. ..................... 703/25 |
| 7,287,073 | B2 * | 10/2007 | Katayama et al. ............ 709/224 |
| 2003/0110412 | A1 * | 6/2003 | Neville ............................ 714/25 |
| 2004/0024767 | A1 * | 2/2004 | Chen ............................. 707/100 |
| 2006/0107088 | A1 * | 5/2006 | Katayama et al. ................ 714/4 |
| 2007/0067264 | A1 * | 3/2007 | Froehlich et al. ................. 707/3 |
| 2011/0122866 | A1 * | 5/2011 | Vasamsetti et al. ........... 370/352 |

FOREIGN PATENT DOCUMENTS

EP    1764981 A1    3/2007

* cited by examiner

*Primary Examiner* — Ian N Moore
*Assistant Examiner* — Eric P Smith

(57) ABSTRACT

A method is provided in a network management node for handling an alarm caused by a fault in a communications system. An alarm caused by a fault in the communications system is received from a first network element within the communications system. The alarm is associated with an identity of the first network element, and an alarm time associated with the time when the alarm was active. After receiving the alarm, the network management node sends a request to a user activity database, requesting one or more matching records. Each of the matching records is requested to comprise an identity equal to the identity of the first network element associated with the alarm, and a record time period that comprises the time when the alarm was active. The network management node receives one or more matching records from the user activity database, which one or more matching user session records identify the user sessions being affected by the alarm, and then handles the alarm based on the one or more matching user session records.

14 Claims, 5 Drawing Sheets

Fig. 2

| | Time | | User | | Network resources | | | |
|---|---|---|---|---|---|---|---|---|
| Starttime | Endtime | IMSI | NB | RNC | SGSN | GGSN |
| 1 | 2 | IMSI_x | NB 3 | RNC 1 | SGSN 3 | GGSN 1 |
| 2 | 7 | IMSI_y | NB 6 | RNC 1 | SGSN 4 | GGSN 1 |
| ... | | | | | | |

Fig. 3

| Time | | User | | Network resources | | | | | Service information | | |
|---|---|---|---|---|---|---|---|---|---|---|---|
| Starttime | Endtime | IMSI | eNB | Cell | MME | SGW | PGW | Bearers | Bearer QoS | Service |
| 1 | 2 | IMSI_x | eNB 3 | Cell 2 | MME 1 | SGW 3 | PGW 2 | 1,2 | High, Normal | VoIP |
| 2 | 7 | IMSI_y | eNB 3 | Cell 1 | MME 1 | SGW 4 | PGW 2 | 1 | Normal | Mobile TV |

HANDLING ALARMS BASED ON USER SESSION RECORDS

TECHNICAL FIELD

The present invention relates to a method and an arrangement in a network management node. In particular, it relates to handling of an alarm caused by a fault in a communications system.

BACKGROUND

When a fault occurs somewhere in a communication network, a Network Element (NE) will send a notification, an alarm, to the network management system. The alarm usually contains certain information that the NE knows about the origin, probable cause and severity of the alarm, e.g.:

Time—which gives the time the alarm was issued.
Object ID—which identifies the Managed Object in the NE sending the alarm.
Severity—which indicates the severity of the alarm, in a range lowest-highest.
Event Type—which gives some indication of what happened.
Probable Cause—which gives some indication of why it happened.
Specific Problems—which clarifies what happened.
Proposed Repair Actions—which gives some suggestion about what to do.

The task for the service provider (potentially aided by some automatic algorithms) is to analyze all the received alarms in terms of network and service impact, and trigger appropriate actions to mitigate the faults.

A non-trivial task in this process is to identify, based on a potentially very large number of alarms from different network elements, the actual faults (root causes) which are causing the alarms. This is generally referred to as alarm correlation, and there exists several methods, such as neural network assisted, rule, cognitive or flow-based methods, for performing alarm correlation.

Another important task in this process is to prioritize the received alarms, in order to judge which alarms are most important and need to be resolved first. The Severity fields of the individual alarms can serve as one input to this prioritization. There are methods proposed that automatically assign alarm priority, based on neural networks that continuously learn from manually assigned priorities in trouble-tickets.

WO2005/032186 describes a method for Performance Management of Cellular Mobile Packet Data Networks which involves capturing raw traffic traces over standardized interfaces of an operational cellular mobile data network, and correlating the information to build a traffic and session database. This involves parsing through various signalling messages to construct the association between subscribers, sessions and transactions. As a result, a user session data base is created and maintained that contains traffic information for users and locating the session to certain cell locations and identities, among them IP addresses of certain nodes in the data path.

For a service provider it is important to be able to determine the severity of alarms in terms of user and service impact. Prioritization of alarms is today mostly performed manually by network administrators, based on their experience and support systems, which is a very time consuming task.

The alarm Severity field can help in a first rough prioritization of alarms, for example an alarm of Critical severity, indicating that a link between two NEs is broken is obviously more important to resolve than alarms of Minor severity. However, there is only a weak correlation between the alarm Severity field and the actual priority that is manually assigned to an alarm. Also when there are several NEs issuing alarms of the same severity at the same time the prioritization process becomes more complex, and the Severity field is of little help.

Two basic examples show the difficulty of user and service aware alarm prioritization:

A High Priority alarm from an NE that is currently not serving any users should receive lower priority than a Medium Priority alarm from an NE that is serving 1000 Gold subscription users.

An alarm from an NE that is currently delivering a high priority (e.g. high margin) end-user service should receive higher priority than an alarm from an NE that only delivers best effort traffic.

One main problem with existing methods is that they do not take into account the current user activity and traffic situation. Therefore it is not possible to prioritize the alarms in terms of how they affect users and services in the network.

SUMMARY

It is therefore an object of the invention to provide a mechanism that improves the handling of alarms in a communications network.

According to a first aspect of the invention, the object is achieved by a method in a network management node for handling an alarm caused by a fault in a communications system. The communications system comprises the network management node and network elements. The network elements are adapted to serve users. The network management node is accessible to a user activity database. The user activity database comprises user session records. Each user session record is associated with parameters relating to a user session, which parameters comprises a record time period during which period the user session took place, an identity of the user using the session, and an identity of each network element involved in the user session during the time period. An alarm caused by a fault in the communications system is received from a first network element within the communications system. The alarm is associated with an identity of the first network element, and an alarm time associated with the time when the alarm was active. After receiving the alarm, the network management node sends a request to the user activity database, requesting one or more matching records. Each of the matching records is requested to comprise an identity equal to the identity of the first network element associated with the alarm, and a record time period that comprises the time when the alarm was active. The network management node receives one or more matching records from the user activity database, which one or more matching user session records identify the user sessions being affected by the alarm. The network management node then handles the alarm based on the one or more matching user session records.

According to a second aspect of the invention, the object is achieved by a network management node within a communications system. The communications system comprises network elements. The network elements are adapted to serve users. The network management node is accessible to a user activity database, which user activity database comprises user session records. Each user session record is associated with parameters relating to a user session. The parameters comprises a record time period during which period the user session took place, an identity of the user using the session, and an identity of each network element involved in the user session during the time period. The network management node comprises a receiving unit configured to receive from a first network element within the communications system, an alarm caused by a fault in the communications system. The alarm is associated with an identity of the first network element, and an alarm time associated with the time when the alarm was active. The network management node further comprises a requesting unit configured to send a request to the user activity database, requesting one or more matching records. Each of the matching records is requested to comprise an identity equal to the identity of the first network element associated with the alarm, and a record time period that comprises the time when the alarm was active. The receiving unit further is configured to receive one or more matching records from the user activity database. The one or more matching user session records identify the user sessions being affected by the alarm. The network management node further comprises a handling unit configured to handle the alarm based on the one or more matching user session records.

Thanks to the received user sessions records related to the alarm, the network management node can handle the alarm based on a more relevant foundation, which in turn means an improved handling of alarms in the communications network.

An advantage with the present solution is that it enables user and service aware handling of alarms, including better prioritization of alarms which takes into account how many and which users/services that are actually affected by an alarm.

A further advantage with the present solution is that it enables analysis of users and/or services that are often affected by alarms or parts of the network where many users are often affected by alarms. Such results may for example be used for network planning and optimization purposes.

A further advantage with the present solution is that it enables dynamic prioritization of alarms according to the service provider's user and service policies.

BRIEF DESCRIPTION OF THE DRAWINGS

The invention is described in more detail with reference to attached drawings illustrating exemplary embodiments of the invention and in which:

FIG. 2 is a combined schematic block diagram and flowchart depicting embodiments of a method.

FIG. 3 is a schematic diagram illustrating embodiments of a user activity database.

DETAILED DESCRIPTION

In brief the present solution and its embodiments are about the following:

For a received alarm a network management node accesses a user activity database to read the user activity in a network element or part of network element that generated the alarm. The network management node attaches such information to the basic network element alarm. The network management node then processes the alarm, and may further use also policy information about subscribers and services to prioritize between the enhanced alarms. The output may e.g. be a prioritization of alarms based on the service(s) they impact.

Figure 1:
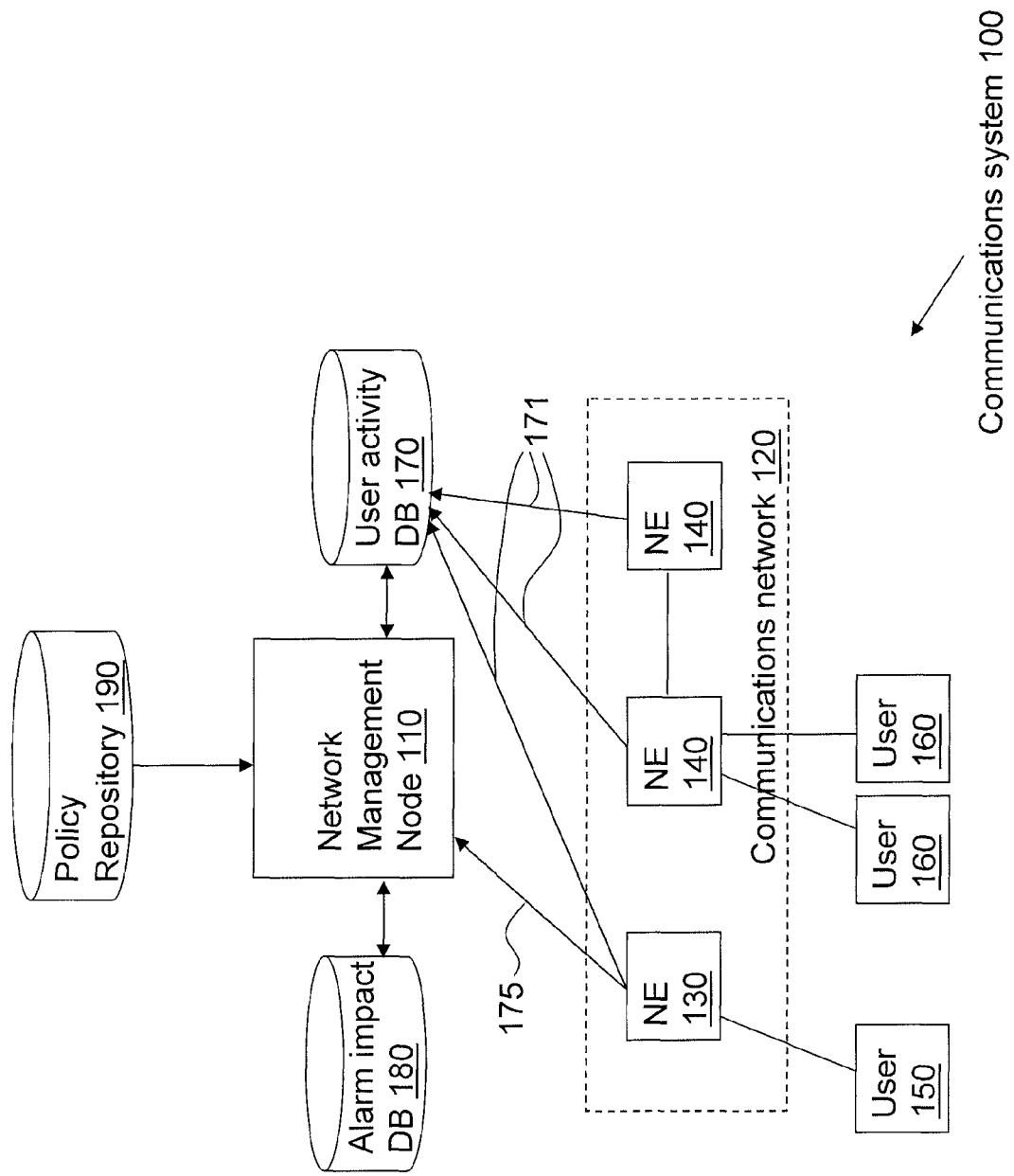
FIG. 1 is a schematic block diagram illustrating embodiments of a communication network.

FIG. 1 depicts a communications system 100. The communications system 100 uses technologies such as e.g. Long Term Evolution (LTE), Wideband Code Division Multiple Access (WCDMA), Global System for Mobile communications (GSM)/Enhanced Data Rates for GSM Evolution (EDGE), Worldwide Interoperability for Microwave Access (WiMAX), System Architecture Evolution (SAE), Universal Mobile Telecommunications System (UMTS), IP technology, Ethernet technology.

The communications system 100 further comprises a network management node 110 managing a communications network 120 comprising network elements 130, 140. The network management node 110 may perform the activities, methods, procedures, and tools that pertain to the operation, administration, maintenance, and provisioning of the communications system 100. This comprises e.g., configuration of the managed network elements 130, 140, analysis of the performance of the services and network elements 130, 140 in the communications system 100, and network planning and upgrade. The network management node 110 further handles alarms caused by faults in the communications system 110.

The network elements 130, 140 serves user equipments 150, 160 used by end users from now on called users. The user equipments 150, 160 may be computers, mobile phones or any other user equipments capable of communicating with the communications network 120. The communication network may e.g. be a Wideband Code Division Multiple Access (WCDMA) network, an LTE/SAE network, a Wireless Local Area Network (WLAN), a Digital Subscriber Line (DSL) network, or an optical fibre network.

The network management node 110 may e.g. be an Operations Support Systems (OSS) node or any other node managing a communications network.

The network elements 130, 140 may e.g. be a NodeB (NB) base station, an Radio Network Controller (RNC), a Serving General packet radio service Support Node (SGSN), an Gateway General packet radio service Support Node (GGSN) or any other serving node within a WCDMA network, or an eNodeB (eNB) base station, a Mobility Management Entity (MME), a Service GateWay (SGW), a Packet data network GateWay (PGW), an Internet protocol Multimedia System (IMS) or any other network element in a LTE/SAE network, or an IP router in an IP-based network, or an Ethernet switch in an Ethernet network.

User Activity Database

Network-wide information about individual user activity and in some cases service usage is stored in a user activity database 170. The network management node 110 is accessible to this user activity database 170, which user activity database 170 stores the information in form of user session records. Each user session record is associated with parameters relating to a user session, which parameters in its most general form comprises a record time period during which period the user session took place, and an identity of the user 150, 160 using the session. The user identity may be a global identifier of the user, such as e.g. the International Mobile Subscriber Identity IMSI of the user. The parameters further comprise an identity of each network element 130, 140 involved in the user session during its time period i.e. between the start time and end time of the session. These involved network elements may also be referred to as network resources. This may be a list of the network elements 130, 140, and maybe also other network resources, that the user was active in during the time of this record. In some embodiments, the parameters associated with each user session record may further comprise object identities relating to identification of the parts of a network element 130, 140 being involved in the user session. The object identities may also be referred to as network resources. I.e. the network resources comprise, on the least detailed level, network elements. It may also comprise more detailed resources i.e. the object identities, within each network element, such as a logical function in a network element, or a specific board of a network element, or e.g. a specific cell in a network element 130, 140. Further, the user activity data base 170 may comprise service information, i.e. information about what type of services the user was using during the time of this record.

The network-wide information about individual user activity and service usage may be constructed by a user session analysis function e.g. within the network management node 110. This may be performed for example from interface probing at multiple measurement points, or from reports sent 171 from the network elements 130, 140 if available. This information is stored in the user activity data base 170. Interface probing means capturing raw packet traces over standardized interfaces, and parsing through the traces in order to extract and correlate the information. E.g., interface probing of the S11 interface, between MME and SGW, and parsing the traces in order to reconstruct the session management procedures of each user.

The granularity of the network resources and service information data available in the user activity data base 170 may depend on the level of information that is reported by individual network elements 130, 140 to the network management node 110 and/or the information available from interface probes.

The Network resources can in the simple case be a list of network elements that the user is registered in. If more detailed information is available, then a more advanced user activity database 170 may include additional attributes, such as more detailed information about which parts of a network element that the user is "located" in, e.g. which cell, or which logical network element function.

The details of the service information field may also vary depending on the implementation of the user session analysis function. Examples of potential service information are:
- The bearers of a user and the Quality of Service (QoS) level of those. A bearer refers to a "virtual" connection between two endpoints (e.g. a UE and a PDN-GW) which is established in a LTE/SAE system before any traffic can be sent between the endpoints.
- Services used, e.g., Voice over IP (VoIP), Video Telephony, Mobile TV, web browsing, streaming, etc. e.g., obtained from service node reports.
- Traffic types used, e.g., web, Peer to Peer (P2P), e-mail, ftp download, video, streaming, e.g. obtained from deep packet inspection on traffic interface.

An example of a simple user activity database 170 is shown in FIG. 2, which contains only information about user location in different network elements at different times, and no service usage information. Such information may be created by correlating just a few different network element reports.

A more advanced user activity database 170 example is shown in FIG. 3, where a more detailed level of network resources as well as service information is comprised.

As mentioned above, the network management node 110 further handles alarms caused by faults in the communications system 110. It may be a variety of different faults such as a link failure, that a disk is full, that a board is faulty, that an interface card is dropping packets, etc. When a fault occurs somewhere in a communication network 120, a network element such as e.g. network element 130, will send a notification, an alarm, to the network management node 110, see arrow 175 in FIG. 1.

Figure 4:
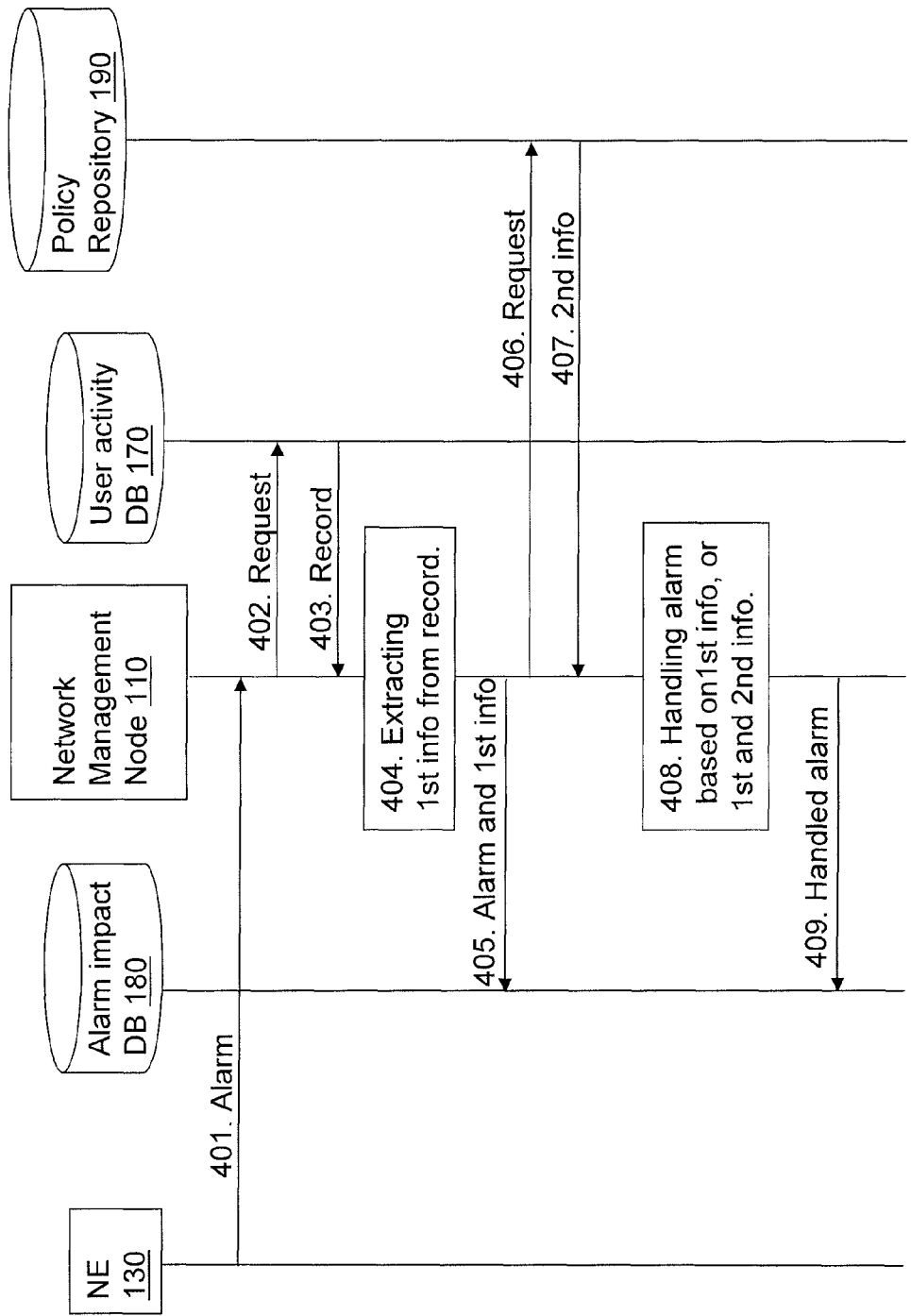
FIG. 4 is a schematic diagram illustrating embodiments of a user activity database.

The present solution method for handling an alarm caused by a fault in a communications system 100, according to some embodiments will no be described with reference to the combined signalling diagram and flowchart depicted in FIG. 4. The method comprises the following steps, which steps may as well be carried out in another suitable order than described below:

Step 401

The network management node 110 receives an alarm caused by a fault in the communications system from one of the network elements, in this example the first network element 130. This may be performed by an alarm message being sent from the first network node 130 to the network management node 110 or to an alarm data base (not shown) being accessible by the management node 110. The network management node may read the alarm in the alarm data base after receiving a notification about a new alarm. The alarm is associated with an identity of the first network element 140 and an alarm time associated with the time when the alarm was active. The alarm may further be associated with an object identity. The object identity relates to an identification of a part of the network element 130, 140 that issued the alarm, and may be any managed object in the network element 130, physical or logical. The object identity may for example by a specific piece of hardware, like a board, or a logical function in the network element. This may be referred to as Managed Object and is a well defined concept of how a network elements parts are modelled.

For example at time t an alarm from eNB x arrives to the network management node 110, which indicates that the connection to the antenna in cell 2 is broken. The following information may then be extracted from the alarm:
NE identity=eNB x
Object identity=cell 2
Time=t Step 402

To find out which users and sessions that are actually affected by the alarm, the network management node 110 sends a request to the user activity database 170, requesting one or more matching records, that matches the network element sending the alarm and any user session that were going on at the time the alarm was sent. I.e. where each of the matching records comprises an identity equal to the identity of the first network element 130 associated with the alarm, and a record time interval that comprises the time when the alarm was active.

In some embodiments, each of the matching records further is requested to comprise an object identity equal to the object identity comprised in the received alarm. For example, if the alarm identifies that that the connection to the antenna in cell 2 is broken in network element 1 that issued the alarm, then not all records from the user activity database that has network elements 1 as network element should be considered a match, but only the ones that have both network element 1 and cell 2 in the record. This makes the matching more precise if this information is available.

Step 403

If matching entries are found in the user activity database, the network management node 110 receives one or more matching records from the user activity database 170.

Step 404

This is an optional step. The network management node 110 extracts information from each matching record. The information extracted from the each match is in this document referred to as the first information. The first information comprises in its most simple form, information about the user session associated with the matching record. The one or more user sessions extracted from the one or more matching records are the sessions being affected by the alarm. Further information may be extracted from the matching record, as mentioned above, such as a list of the network resources that the user was active in during the time of this record, service information, etc.

Step 405

This is an optional step. The network management node 110 may be accessible to an alarm impact database 180, see also FIG. 1. In the most general embodiment, the alarm impact data base 180 stores the relationship between network element alarms and user sessions. I.e. as a result, each alarm is mapped to the set of user sessions that may have been impacted by the alarm in the alarm impact database 180.

Each data record in the alarm impact database 180 corresponds to one network element alarm. In addition, the alarm impact database may store, for each alarm data record, a list of user service information such as traffic information that is impacted by the alarm. In this optional step, the network management node 110 stores in the alarm impact database 180, the record for the received alarm being associated with the first information in the received one or more matching records from the user activity database 170, i.e. the first information associated with the set of user sessions impacted by the alarm. A copy of each alarm in the alarm database and copies of entries in the user activity database 170 may be stored in the alarm impact database, but as an alternative, pointers to the relevant entries in the alarm database and/or in the user activity database 170 may be stored.

If no match is found, information about this may be attached to the alarm and may be stored in the alarm impact database 180.

Step 406

This is also an optional step. The network management node 110 may be accessible to a policy repository 190, see also FIG. 1. The policy repository 190 for subscriber and service policies may comprise information about priorities of different subscribers and services that are offered in the communication network 100. These policies are adjustable by the service provider, since they may depend for example on the service provider's business model. In this optional step the network management node 110 sends a request to the policy repository 190, requesting information. The information relating to the policy repository 190 is in this document is referred to as the second information. The requested second information comprises information about user policies and/or service policies associated with each user and/or service affected by the alarm.

Step 407

This is also an optional step that will be taken if optional step 406 is taken. In this step the network management node 110 receives the requested second information from the policy repository.

Step 408

The network management node 110 then handles the alarm. In the most general embodiment the alarm is handled based on only the first information. In other embodiments, the alarm is handled based on both first information and the second information. In some embodiments this step of handling the alarm comprises establishing priority of the alarm, e.g. by computing the alarm priority. In other embodiments the handling may involve analysis of users and/or services that are often affected by alarms or parts of the network where many users are often affected by alarms. Such results may for example be used for network planning and optimization purposes. An advantage with the present solution is that the network management 110 may handle the alarm by using input from the alarm impact database 180 and the policy repository 190 in order to compute priorities for the different alarms. I.e., the user and service impact of each alarm may be used as basis for the prioritization. According to service provider policies the alarms are prioritized so that alarms affecting important users and services receive higher priority in the output alarm list.

Step 409

This step is optional. In this step the network management node 110 may store in the alarm impact database 180, the established priority of the alarm associated with the record for the received alarm, i.e. in this way the priority information may be added to the alarm data record in the alarm impact database 180.

Figure 5:
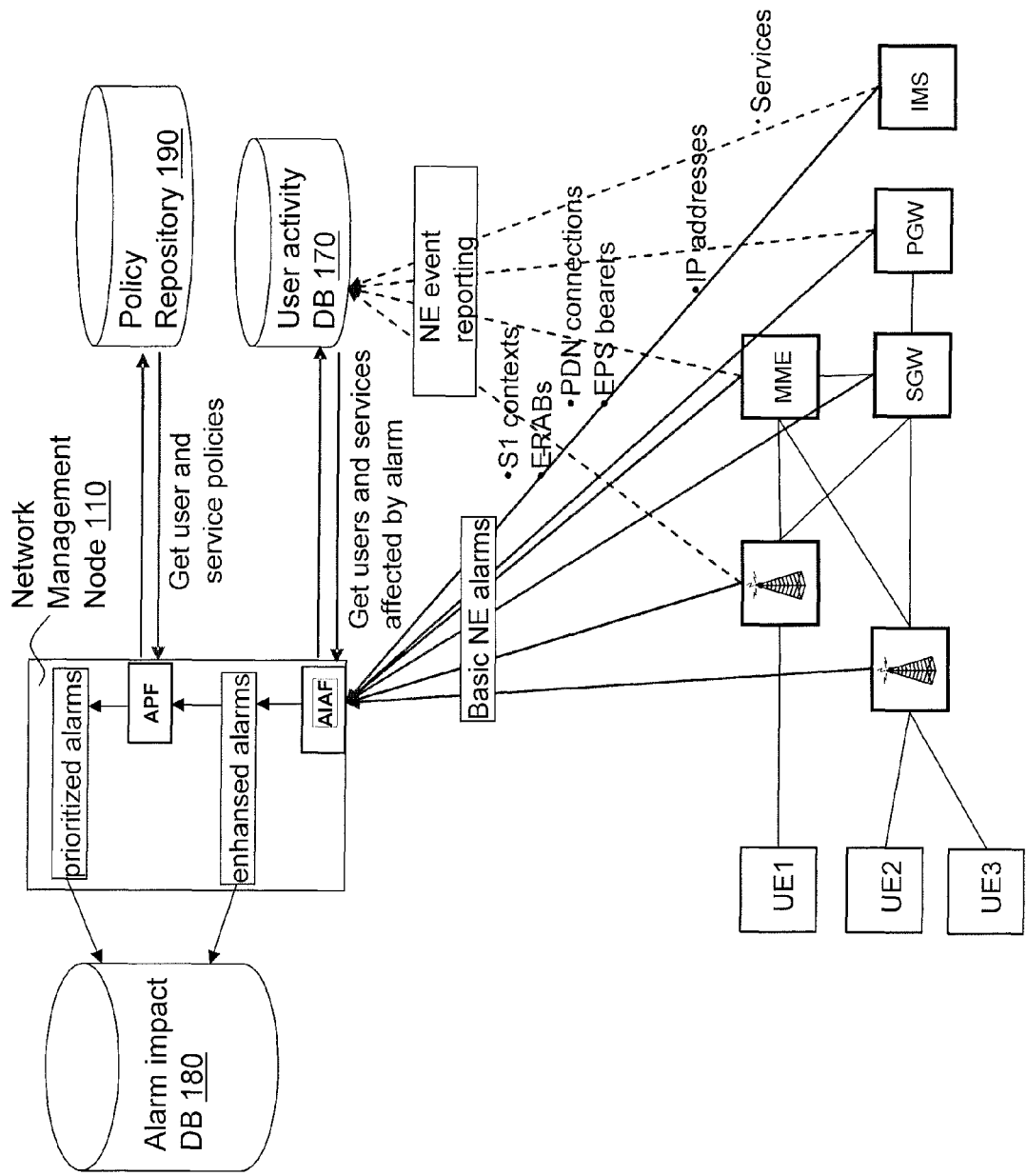
FIG. 5 is a schematic block diagram illustrating embodiments of a communication network.

FIG. 5 shows an example of the present solution in an LTE/SAE system. Only a few network elements are shown in the picture for simplicity, but there may be more network elements involved in the process. The network elements shown in the figure are:

eNB—LTE Radio Base Station
MME—Mobility Management Entity
SGW—Serving Gateway
PGW—Packet Data Network Gateway
IMS—IP Multimedia Subsystem Three user equipments UE1, UE2 and UE3 are shown in FIG. 5. The different network elements may be configured to report when certain events happen, for example when a protocol message is sent or received, or when an internal procedure is completed or a decision is made. Each network element reports about information that is naturally available in the network element, e.g. with additional attributes such as timestamps and identities which enables correlation of events from different network elements across the system.

Reports from different network elements in the system are correlated, and the user activity database 170 is continuously updated with real-time information about user locations and service usage. In an LTE/SAE example the eNB may report about UE S1 contexts. S1 is the standardized interface between eNB and the Evolved Packet Core (EPC), and UE S1 context is a per UE logical connection between MME and eNB, and radio bearer handling (setups and releases). The MME may report about Packet Data Network (PDN) connection and Evolved Packet System (EPS) bearer handling, and the PGW may provide information about UE IP address allocation. The IMS system events may comprise information about user services, such as e.g. establishments of Voice over IP calls.

FIG. 3 shows an example of a user activity database 170 after correlation of events from several network elements in an LTE/SAE system.

As an example, at time t an alarm from eNB 3 arrives to the Network Management node 110 e.g. to an Alarm Impact Analysis Function (AIAF) within the Network Management node 110, which indicates that the connection to the antenna in cell 2 is broken. As mentioned above, the following information is extracted from the alarm NE identity=eNB 3
Time=t
Object identity=cell 2 and the user activity database 170 is queried by the network management node 110 for matches with this information. The user activity database 170 may give a reply which means that there are currently 10 users which have a radio connection to cell 2 in eNB 3 and that 7 of these are using the VoIP service, and 3 are using web browsing.

The alarm impact database 180 is updated with information about the relation between this alarm and the 10 affected records in the user activity database 170.

The network management node 110, e.g. an Alarm Prioritizing Function (APF) within the network management node 110 then processes the enhanced alarms and combines it with information about user and subscriber policies for this service provider. The alarm is assigned a priority based on the 7 VoIP users and 3 web browsing users affected by the alarm.

The details of the network resources stored in the user activity database 170 may be low if the system does not support to locate a user in a more detailed manner. In the worst case only the network element is reported, which means that for high aggregation nodes (e.g., the MME an LTE/SAE system) there will be many users identified as potentially affected by an alarm.

To limit this effect an additional field may be included in the network element alarm. In addition to severity information in the alarms, the alarm impact database 180 may store a traffic impact factor. This factor may estimate the ratio of connections or sessions impacted by the alarm. One example is a core node, which has X internal boards to handle a traffic function. If one of them goes down, the ratio of impact may be estimated as 1/x. The traffic impact factor may then be taken into account by the network management node 110, in some embodiments by the APF when handling the alarm such as when estimating the priority of the alarm.

The traffic estimate may be provided by the network element generating the alarm, or be calculated by the network management node 110, in some embodiments by the AIAF.

Relating an alarm to the impact that it has on specific users and services, requires data to be collected from several sources in the network, and the processing and correlation of such data. A single network element can not determine the impact of an alarm on users and services for several reasons:

The network element does not always have the necessary information about what services and users it is currently serving, e.g., in an LTE/SAE network the eNB does not know about the IMSIs of the users that it is serving.

The network element does not have knowledge about user and service policies specified by the service provider, and therefore cannot prioritize alarms based on important users/services locally.

The advantage of handling the alarm on network management level such as in the present solution is that information from several different sources in the network can be combined in order to provide a more relevant foundation for alarm handling. Connecting an alarm to affected user sessions on network management level enables detailed policy-based prioritization, as well as drill-downs to which users are affected by which alarms.

Figure 6:
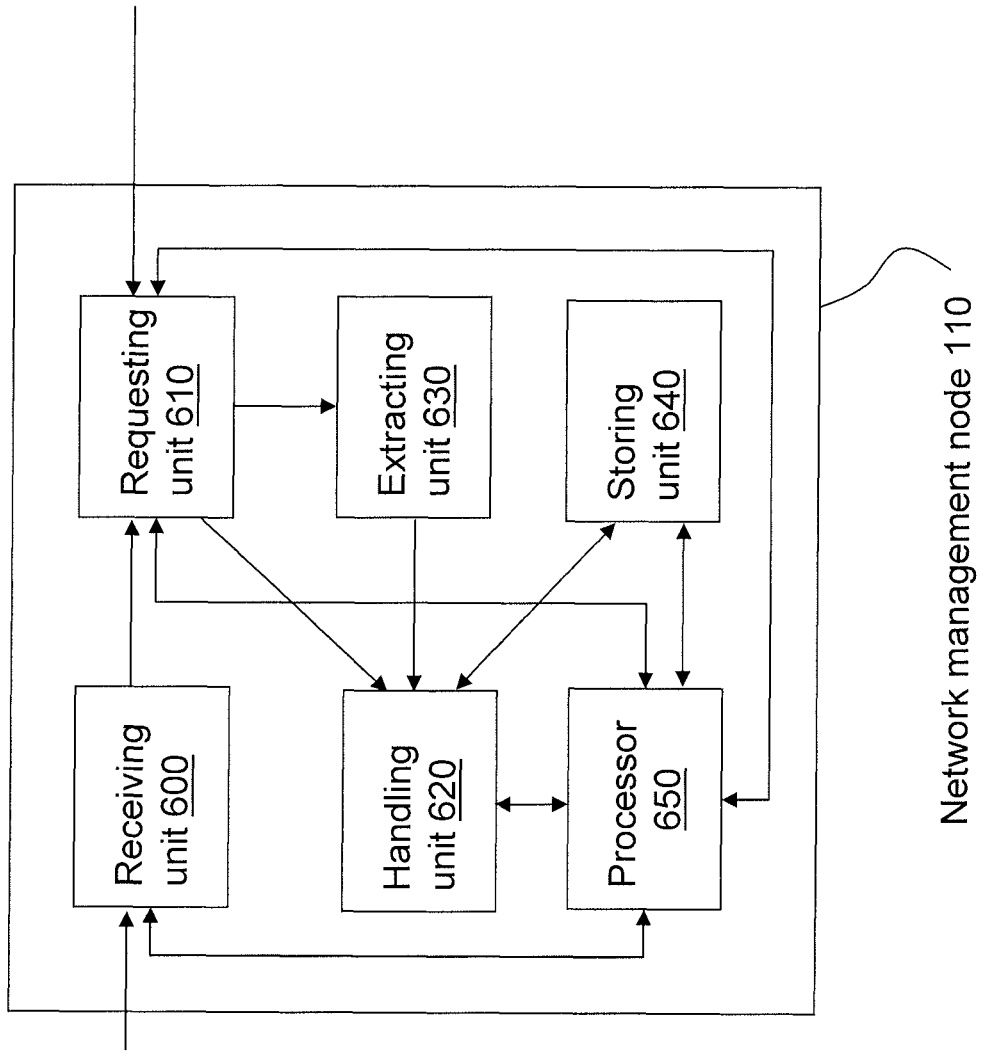
FIG. 6 is a schematic block diagram illustrating embodiments of a network management node.

To perform the method steps above for handling an alarm caused by a fault in a communications system 100, the first network management node 110 comprises an arrangement depicted in FIG. 6. As mentioned above, the network management node 110 is comprised within a communications system 100. The communications system 100 comprises the network elements 130, 140. The network elements 130, 140 are adapted to serve the users 150, 160.

The network management node 110 is accessible to the user activity database 170. The user activity database 170 comprises user session records. Each user session record is associated with parameters relating to a user session, which parameters comprises a record time period during which period the user session took place, an identity of the user 150, 160 using the session, and an identity of each network element 130, 140 involved in the user session during the time period.

The network management node 110 comprises a receiving unit 600 configured to receive from the first network element 130 within the communications system 100, an alarm caused by a fault in the communications system 100. The alarm is associated with an identity of the first network element 130, and an alarm time associated with the time when the alarm was active.

The receiving unit 600 further is configured to receive one or more matching records from the user activity database 170. The one or more matching user session records identify the user sessions being affected by the alarm.

The network management node 110 further comprises a requesting unit 610 configured to send a request to the user activity database 170, requesting one or more matching records. Each of the matching records is requested to comprise an identity equal to the identity of the first network element 130 associated with the alarm, and a record time period that comprises the time when the alarm was active.

In some embodiments each record of the user activity database further is associated with service information related to the user session in the user session record, The network management node 110 further comprises a handling unit 620 configured to handle the alarm based on the one or more matching user session records.

In some embodiments, the network management node 110 further comprises an extracting unit 630 configured to extract a first information from each matching record, which first information comprises the user identity associated with the matching user session record.

The first information may further comprise all network elements 130, 140 being involved in the user session associated with the matching record, and/or information about one or more services related to the user session associated with the matching record.

In these embodiments, the handling unit 620 may further be configured to handle the alarm based on the one or more matching user session records and being based on the extracted first information.

In some embodiments the network management node 110 is accessible to the alarm impact database 180. In these embodiments the network management node 110 may further comprise a storing unit 640 configured to store in the alarm impact database 180, a record for the received alarm being associated with the first information.

In some embodiments, the network management node 110 is accessible to the policy repository 190. In these embodiments, the requesting unit 610 may further be configured to send a request to a policy repository 190, requesting a second information. The second information comprises information about user policies and/or service policies associated with each user and/or service affected by the alarm. In these embodiments, the receiving unit 600 may further be configured to receive the requested second information from the policy repository 190, and the handling unit 620 may further be configured to handle the alarm based on the second information.

In some embodiments, the handling unit 620 further is configured to handle the alarm by establish a priority of the alarm, analyse users and/or services that are often affected by alarms, or parts of network where many users are often affected by alarms.

In some embodiments, the storing unit 640 is further configured to store the established priority of the alarm in the alarm impact database, associated with the record for the received alarm.

In some embodiments, the parameters associated with each user session record further comprises object identities relating to identification of the parts of a network element 130, 140 being involved in the user session. In these embodiments the received alarm may further be associated with an object identity, which object identity relates to an identification of a part of the network element 130, 140 that issued the alarm. Each of the matching records is further configured to be requested by the requesting unit 610 to comprise an object identity equal to the object identity comprised in the received alarm.

In some embodiments, the received alarm is further associated with a traffic impact factor. The traffic impact factor comprises an estimate of the ratio of connections or sessions impacted by the alarm. In this case the handling unit 620 further is configured to handle the alarm based on the extracted traffic impact factor.

The present mechanism for handling an alarm caused by a fault in a communications system 100 may be implemented through one or more processors, such as a processor 650 in the network management node 110 depicted in FIG. 6, together with computer program code for performing the functions of the present solution. The program code mentioned above may also be provided as a computer program product, for instance in the form of a data carrier carrying computer program code for performing the present solution when being loaded into the network management node 110. One such carrier may be in the form of a CD ROM disc. It is however feasible with other data carriers such as a memory stick. The computer program code can furthermore be provided as pure program code on a server and downloaded to the network management node 110 remotely.

When using the word "comprise" or "comprising" it shall be interpreted as non-limiting, i.e. meaning "consist at least of".

The present invention is not limited to the above described preferred embodiments. Various alternatives, modifications and equivalents may be used. Therefore, the above embodiments should not be taken as limiting the scope of the invention, which is defined by the appending claims.

The invention claimed is:

1. A method in a network management node for handling an alarm caused by an associated fault in a communications system, the communications system comprising the network management node, a plurality of network elements, and a policy repository accessible by the network management node, the method comprising:
   receiving from a first network element within the communications system, the alarm caused by the associated fault in the communications system, the alarm including an identity of the first network element and an alarm time indicating when the alarm was active;
   determining which users and sessions are being affected by the fault associated with the alarm by performing the following:
      sending a request to a user activity database, wherein the user activity database comprises user session records and is accessible by the network management node, each user session record including a user identity, a record time period during which an associated user session took place, and an identity of each network element involved in the associated user session, the request requesting one or more matching records, where each of the matching records includes a network element identity equal to the identity of the first network element associated with the alarm, and a record time period for an associated user session that includes the alarm time indicating when the alarm was active; and
      receiving one or more matching records from the user activity database, wherein the one or more matching user session records identify the users and user sessions being affected by the fault;
   sending a request to the policy repository, requesting information about user policies associated with each user affected by the fault;
   receiving the requested user policy information from the policy repository;
   establishing a priority of the alarm; and
   handling the alarm based on the one or more matching user session records and the user policy information associated with each user affected by the fault.

2. The method according to claim 1, wherein the network management node has access to an alarm impact database, the method further comprising:
   storing in the alarm impact database, a record for the received alarm and the associated user session records.

3. The method according to claim 1, wherein each user session record of the user activity database is further associated with service information related to the user session in the user session record;
   wherein sending the request to the policy repository also includes requesting information about service policies relating to the service information; and
   wherein handling the alarm includes handling the alarm based on the one or more matching user session records, the user policies associated with each user affected by the fault, and the service policies relating to the service information about one or more services related to the user session associated with the matching record.

4. The method according to claim 1, wherein the step of handling the alarm comprises one or more of:
   analyzing users or services that are affected by alarms; and
   analyzing parts of the network where a plurality of users are affected by alarms.

5. The method according to claim 4, further comprising:
   storing the established priority of the alarm in the alarm impact database, associated with the record for the received alarm.

6. The method according to claim 1, wherein each user session record also includes object identities relating to identification of the parts of a network element involved in the user session;
   wherein the received alarm is further associated with an object identity relating to an identification of a part of the network element that issued the alarm; and
   wherein sending the request to the user activity database includes requesting matching records that include an object identity equal to the object identity received in the alarm.

7. The method according to claim 1, wherein the received alarm is further associated with a traffic impact factor, wherein the traffic impact factor comprises an estimate of the ratio of connections or sessions impacted by the fault associated with the alarm; and
   wherein handling the alarm is further based on the traffic impact factor.

8. A network management node within a communications system having a plurality of network elements configured to serve users, and a policy repository accessible by the network management node, the network management node comprising:

a receiving unit that receives from a first network element within the communications system, an alarm caused by an associated fault in the communications system, the alarm including an identity of the first network element and an alarm time indicating when the alarm was active;

wherein the network management node is configured to determine which users and sessions are being affected by the fault associated with the alarm utilizing the following:

a requesting unit configured that sends a request to a user activity database, wherein the user activity database comprises user session records and is accessible by the network management node, each user session record including a user identity, a record time period during which an associated user session took place, and an identity of each network element involved in the associated user session, the request requesting one or more matching records, where each of the matching records includes a network element identity equal to the identity of the first network element associated with the alarm, and a record time period for an associated user session that includes the alarm time indicating when the alarm was active; and a receiving unit that receives one or more matching user session records from the user activity database, wherein the one or more matching user session records identify the users and user sessions being affected by the fault;

wherein the network management node further:

sends a request to the policy repository, requesting information about user policies associated with each user affected by the fault;

receives the requested user policy information from the policy repository;

establishes a priority of the alarm; and handles the alarm based on the one or more matching user session records and the user policy information associated with each user affected by the fault.

9. The network management node according to claim 8, wherein the network management node has access to an alarm impact database, and the network management node further comprises a storing unit that stores in the alarm impact database, a record for the received alarm and the associated user session records.

10. The network management node according to claim 8, wherein each user session record of the user activity database is further associated with service information related to the user session in the user session record; and wherein sending the request to the policy repository also includes requesting information about service policies relating to the service information; and wherein handling the alarm includes handling the alarm based on the one or more matching user session records, the user policies associated with each user affected by the fault, and the service policies relating to the service information about one or more services related to the user session associated with the matching record.

11. The network management node according to claim 8, wherein the handling unit further handles the alarm by one or more of:

analyzing users or services that are affected by alarms; and analyzing parts of the network where a plurality of users are affected by alarms.

12. The network management node according to claim 11, wherein the storing unit further stores the established priority of the alarm in the alarm impact database, associated with the record for the received alarm.

13. The network management node according to claim 8, wherein each user session record also includes object identities relating to identification of the parts of a network element involved in the user session; and wherein the received alarm is further associated with an object identity relating to an identification of a part of the network element that issued the alarm; and wherein the requesting unit sends to the user activity database, a request for matching user session records that include an object identity equal to the object identity received in the alarm.

14. The network management node according to claim 8, wherein the received alarm is further associated with a traffic impact factor, wherein the traffic impact factor comprises an estimate of the ratio of connections or sessions impacted by the fault associated with the alarm; and wherein the handling unit further handles the alarm based on the traffic impact factor.

\* \* \* \* \*

UNITED STATES PATENT AND TRADEMARK OFFICE
CERTIFICATE OF CORRECTION

PATENT NO. : 8,804,492 B2
APPLICATION NO. : 13/392936
DATED : August 12, 2014
INVENTOR(S) : Bertze et al.

It is certified that error appears in the above-identified patent and that said Letters Patent is hereby corrected as shown below:

On the Title Page

Item (75), under "Inventors", in Column 1, Line 1, delete "Spanga" and insert -- Spånga --, therefor.

Item (75), under "Inventors", in Column 1, Line 1, delete "Andras" and insert -- Andras Gergely --, therefor.

In the Specification

In Column 4, Line 23, delete "communications system 110." and insert -- communications system 100. --, therefor.

In Column 5, Lines 63-64, delete "communications system 110." and insert -- communications system 100. --, therefor.

In Column 6, Line 6, delete "will no be" and insert -- will not be --, therefor.

In Column 10, Line 25, delete "record," and insert -- record. --, therefor.

In the Claims

In Column 13, Line 14, in Claim 8, delete "configured that" and insert -- configured to --, therefor.

Signed and Sealed this
Twenty-third Day of June, 2015

Michelle K. Lee
*Director of the United States Patent and Trademark Office*